United States Patent
Dubay

(10) Patent No.: US 7,631,851 B2
(45) Date of Patent: Dec. 15, 2009

(54) HIGH VOLUME VACUUM/VENT BLOCK FOR MOLDING AND CASTING SYSTEMS

(76) Inventor: Richard L. Dubay, 11748 Crocus St., Coon Rapids, MN (US) 55433

( * ) Notice: Subject to any disclaimer, the term of this patent is extended or adjusted under 35 U.S.C. 154(b) by 382 days.

(21) Appl. No.: 11/715,064

(22) Filed: Mar. 2, 2007

(65) Prior Publication Data

US 2008/0211129 A1  Sep. 4, 2008

(51) Int. Cl.
B29C 33/46 (2006.01)
(52) U.S. Cl. .................. 249/141; 425/812; 425/192 R; 164/305; 164/410
(58) Field of Classification Search ................ 425/546, 425/812, 192 R, 420; 249/141; 164/410, 164/305
See application file for complete search history.

(56) References Cited

U.S. PATENT DOCUMENTS

| | | |
|---|---|---|
| 2,890,488 A | 6/1959 | Gemberling |
| 3,349,833 A | 10/1967 | Hodler |
| 3,892,508 A | 7/1975 | Hodler |
| 3,991,971 A | 11/1976 | Drake |
| 4,027,726 A | 6/1977 | Hodler |
| 4,153,231 A | 5/1979 | Hayakawa et al. |
| 4,352,388 A | 10/1982 | Perrella |
| 4,359,443 A | 11/1982 | Michaels |
| 4,380,261 A | 4/1983 | Suzuki et al. |
| 4,828,479 A | 5/1989 | Pleasant |
| 4,986,338 A | 1/1991 | Yamauchi et al. |
| 5,012,568 A | 5/1991 | DiSimone et al. |
| 5,263,532 A | 11/1993 | Kawaguchi et al. |
| 5,350,289 A | 9/1994 | Martin |
| 5,360,049 A | 11/1994 | Rowe |
| 5,533,564 A | 7/1996 | Alberola et al. |
| 5,562,150 A | 10/1996 | Shimmell |
| 5,690,159 A | 11/1997 | Mizukusa |
| 5,913,355 A | 6/1999 | Muramatsu |
| 5,913,356 A | 6/1999 | Muramatsu |
| 6,116,891 A | 9/2000 | Starkey |
| 6,431,254 B2 | 8/2002 | Dittrich |
| 6,443,723 B1 | 9/2002 | Buttigieg |
| 6,591,893 B1 | 7/2003 | Ratte et al. |
| 6,634,411 B2 | 10/2003 | Hirano et al. |
| 6,634,412 B1 | 10/2003 | Murray et al. |

(Continued)

OTHER PUBLICATIONS

Web site www.ngkmetals.com/chillcust.html, printed Jan. 16, 2004. (1 page).

(Continued)

Primary Examiner—Maria Veronica D Ewald
(74) Attorney, Agent, or Firm—Kinney & Lange, P.A.

(57) ABSTRACT

A gas purging block for use with injection molding and die casting systems comprises a stationary-side block for connecting to a stationary mold or die half, and a movable-side block for connecting to a movable mold or die half. The stationary-side block comprises a recessed cooling face having a first smooth contour extending between a first side and a second side of the stationary-side block to increase the surface area of the recessed cooling face. The movable-side block comprises a protruding cooling face having a second smooth contour extending between a first side and a second side of the movable-side block to increase the surface area of the protruding cooling face.

26 Claims, 6 Drawing Sheets

U.S. PATENT DOCUMENTS

| | | | |
|---|---|---|---|
| 6,637,498 | B1 | 10/2003 | Macheske et al. |
| 7,111,663 | B2 | 9/2006 | Murray et al. |
| 7,134,637 | B2 | 11/2006 | Dubay |
| 2002/0100860 | A1 | 8/2002 | Wieder |
| 2002/0127292 | A1 | 9/2002 | Gallinotti et al. |
| 2004/0109909 | A1* | 6/2004 | Dubay .................. 425/130 |

OTHER PUBLICATIONS

Web site www.ngkmetals.com/chilladvn.html, printed Jan. 16, 2004. (1 page).
Web site www.ngkmetals.com/chillvent.html, printed Jan. 16, 2004. (2 pages).
CASTvac™ product brochure, (5 pages), pub. 2004.

* cited by examiner

HIGH VOLUME VACUUM/VENT BLOCK FOR MOLDING AND CASTING SYSTEMS

BACKGROUND OF THE INVENTION

The present invention relates to injection molding and die casting systems. In particular, the present invention relates to vacuum blocks and vent blocks used with injection molding and die casting systems.

Injection molding and die casting processes typically incorporate stationary and movable mold halves, which open and close along a parting line to define a cavity where the molding or casting manufacturing material is injected. Stationary mold halves, also known as fixed-die halves, fixed holder blocks, or cover blocks, are mounted to stationary platens. In contrast, movable mold halves, also known as movable-die halves, movable holder blocks, or ejector halves, are capable of moving relative to the stationary mold half for opening and closing the cavity. Movable mold halves are mounted to ejector platens, which are generally connected to hydraulic actuators for providing the movement required for ejecting the manufactured part.

Vacuum assistance in injection molding and die casting processes has been utilized to varying degrees for optimizing product quality. The general intent of the vacuum is to improve the production of injection molding and die casting by removing gases from within the molding and casting cavities. These improvements include higher surface quality, reduced level of porosity, and greater mechanical characteristics such as strength. Vacuum assistance generally requires the use of a vacuum pump, a vacuum line connecting the pump to the molding or casting cavity, and a means for preventing injected material from overflowing into the vacuum system. One approach for preventing the flow of the injected material is with an automated or manual valve located along the vacuum line. The purpose of the valve is to stop the flows of the vacuum and the injected material before the material enters the vacuum system.

An alternative approach for preventing overflow of the injected material is with gas purging blocks, such as a vacuum block or a vent block. Vacuum blocks are typically connected to the stationary and movable mold halves, and simultaneously provide a gas path for allowing the vacuum to remove the gases, and allow the excess injected material to solidify during the drawing of the vacuum. The solidified material functions as a stopper, preventing further manufacturing material from flowing out of the vacuum block and into the vacuum system. As such, vacuum blocks preclude the need for mechanical valves.

Similarly, vent blocks allow gases to be purged from the cavity of a molding or casting system by the force of the injected material flowing into the cavity. If the injected material is not stopped, it will continue to overflow out of the vent block with the purged gas. The vent block allows the injected material to solidify within the gas path during the injection process, effectively stopping-up the gas path to permit the injected material to fully fill the cavity. As with vacuum blocks, the solidified material must be ejected from the vent block along with the new product being ejected from the mold or die cavity. Typically, with both vacuum blocks and vent blocks, the overflow material that solidifies in the blocks is cut from the molded products and recycled back into the raw materials for further use.

Based upon the molding or casting process required, different vacuum blocks or vent blocks may be required. For example, manufacture of parts or components having different volumes requires mold or die cavities with different shot sizes and a vacuum or vent block with a corresponding capacity. Larger cast or mold pieces require more gas to be purged from the system, which also requires large amounts of excess injected manufacturing material to be drawn into the vent block or vacuum block. As such, there is a need in the industry for vacuum and vent blocks that have large flexibility in their ability to draw a vacuum or vent a mold, and that are also able to rapidly cool and easily eject overflow manufacturing material from the vacuum or vent block after production.

BRIEF SUMMARY OF THE INVENTION

The present invention is directed toward a gas purging block for use with injection molding and die casting systems. The gas purging block comprises a stationary-side block for connecting to a stationary mold or die half, and a movable-side block for connecting to a movable mold or die half. The stationary-side block comprises a recessed cooling face having a first smooth contour extending between the first side and the second side of the stationary-side block to increase the surface area of the recessed cooling face. The movable-side block comprises a protruding cooling face having a second smooth contour extending between a first side and a second side of the movable-side block to increase the surface area of the protruding cooling face.

DETAILED DESCRIPTION

Figure 1:
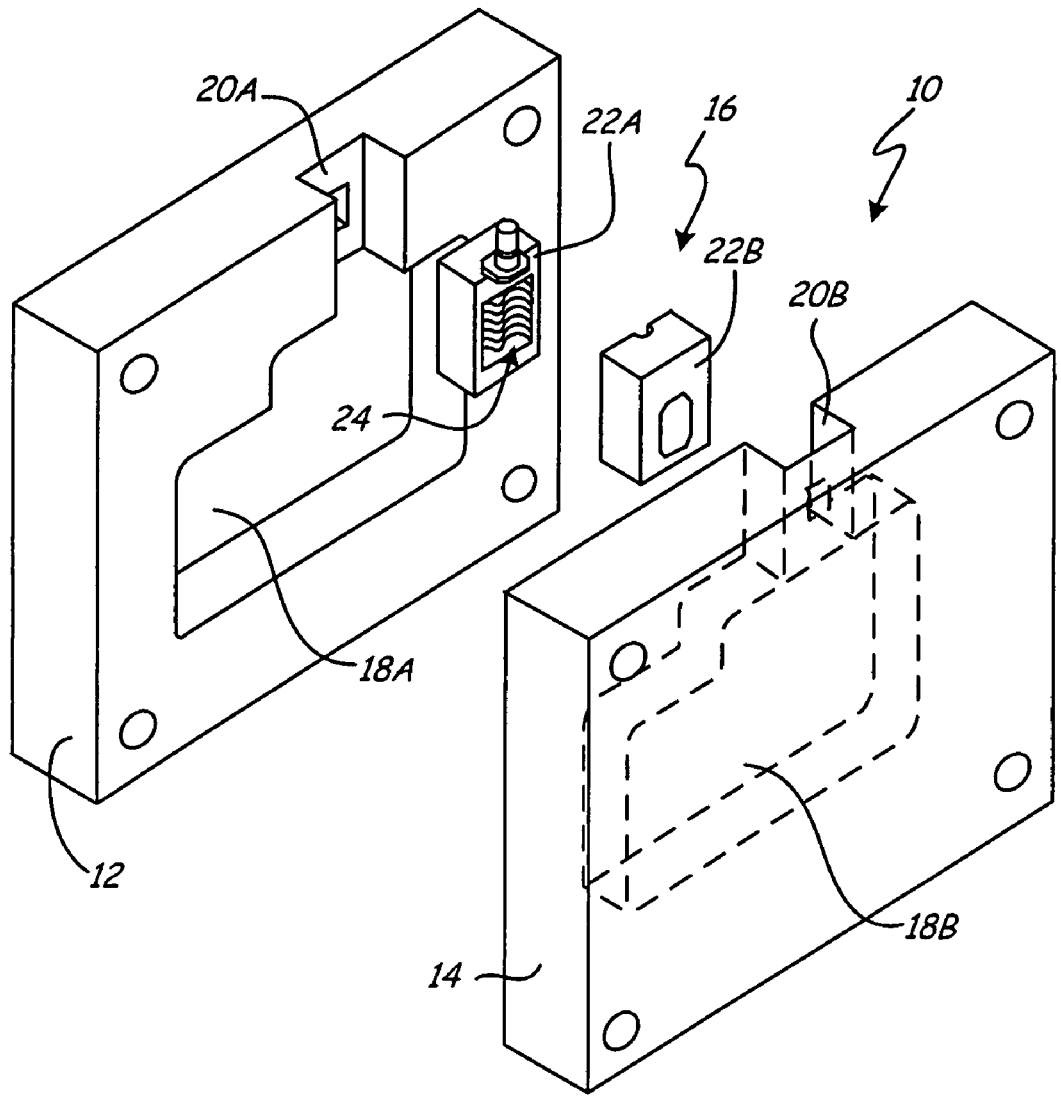
FIG. 1 shows an exploded view of an injection molding system in which the vacuum/vent block of the present invention is used.

FIG. 1 is an exploded view of injection molding or die casting system 10. Injection molding or die casting system 10 includes stationary mold half 12, movable mold half 14 and vacuum/vent block 16 of the present invention. For simplification, additional components of molding or casting system 10, such as the platens, the ejector pin, the vacuum system, and the injection mechanism, are not illustrated. Stationary mold half 12 includes mold cavity 18A and vent block pocket 20A, and movable mold half 14 includes mold cavity 18B and block pocket 20B. Movable mold half 14 mates with a stationary mold half 12 along a parting line such that mold cavity 18B aligns with mold cavity 18A to form a die or mold cavity. As such, manufacturing material, such as molten metal or plastic, can be introduced into the cavity to produce an article matching the shape of cavities 18A and 18B. Manufacturing material is injected into cavities 18A and 18B through the not illustrated injection mechanisms positioned at various locations around mold halves 12 and 14. As manufacturing material is injected into cavities 18A and 18B, gas is purged from cavities 18A and 18B through vacuum/vent block 16. Vacuum/vent block 16 includes contoured and ribbed passageway 24 such that it can be used in conjunction with molds and dies having a wide range of capacities.

Vacuum/vent block 16 includes stationary-side gas purging block 22A and movable-side gas purging block 22B, which are respectively held in block pockets 20A and 20B. When stationary mold half 12 mates with movable mold half 14, stationary-side block 22A aligns with movable-side block 22B to assemble vacuum/vent block 16. Stationary side block 22A is mounted directly to mold half 12 at pocket 20A such that the back of stationary side block 22A is flush with the wall of cavity 18A. Similarly, movable side block 22B is mounted directly to mold half 14 at pocket 22B such that the back of movable side block 22B is flush with the wall of cavity 18B. Alternatively, gas purging blocks 22A and 22B may be secured to mold halves 12 and 14 through cavity inserts (not shown). Cavity inserts are frames supported within cavities 18A and 18B, as is known in the art, for enhancing the shapes and designs of the molds or die casts. In such a case, stationary side block 22A and movable side block 22B are inserted into pockets 20A and 20B, and then mounted to the cavity inserts.

When a molding or casting process begins, mold halves 12 and 14 converge together to create a complete cavity from cavities 18A and 18B for manufacturing an article or part. This also allows stationary side block 22A and movable side block 22B to close together to function as vacuum/vent block 16 such that manufacturing material can be freely injected into cavities 18A and 18B. In order to alleviate porosity problems in the manufactured article, as well as to enhance other properties of the manufactured article, gas contained in cavities 18A and 18B is allowed to escape through vacuum/vent block 16. Vacuum/vent block 16 is functional as either a vent block or a vacuum block.

When vacuum/vent block 16 functions as a vacuum block, a vacuum source is connected to block 16 such that a vacuum can be simultaneously pulled through vacuum/vent block 16 to evacuate gases from cavities 18A and 18B. Vacuum/vent block 16 includes passageway 24 that permits gas leakage, but prevents manufacturing material from entering the vacuum source or leaking outside of mold halves 12 and 14. Manufacturing material is sucked into vacuum/vent block 16 by the vacuum source as the gases are expunged from cavities 18A and 18B. The sucked out material solidifies as it travels through passageway 24, plugging up vacuum/vent block 16, allowing the manufacturing material to solidify within passageway 24 to cease flow of additional material into vacuum/vent block 16. As such, the manufacturing material is permitted to fill up cavities 18A and 18B and to solidify in a reduced-gas environment thereby, among other things, reducing the porosity of the solidified article.

Vacuum/vent block 16 also functions as a simple vent block wherein gas is allowed to exit through block 16 through a vent valve. In lieu of pulling a vacuum through block 16, the gases are purged from cavities 18A and 18B by the flow of the injected material into cavities 18A and 18B. Excess manufacturing material continues to flow into vacuum/vent block 16 as it is injected into cavities 18A and 18B. The excess material is, however, prevented from exiting system 10 through block 16. The excess material solidifies as it travels through passageway 24 of block 16 thereby plugging up the vacuum/vent block 16 after the gases have been pushed out by the manufacturing material, such as in the case of a vacuum block.

The ability of vacuum/vent block 16 to cool excess or overflow manufacturing material flowing through it depends on its ability to cool the manufacturing material before it makes its way out of channel 24. To enhance the heat exchanging capabilities, the surface of channel 24 is ribbed and contoured to increase its surface area and volume, thus allowing vacuum/vent block 16 to be used with a wider variety of die casting and injection molding systems.

Figure 2:
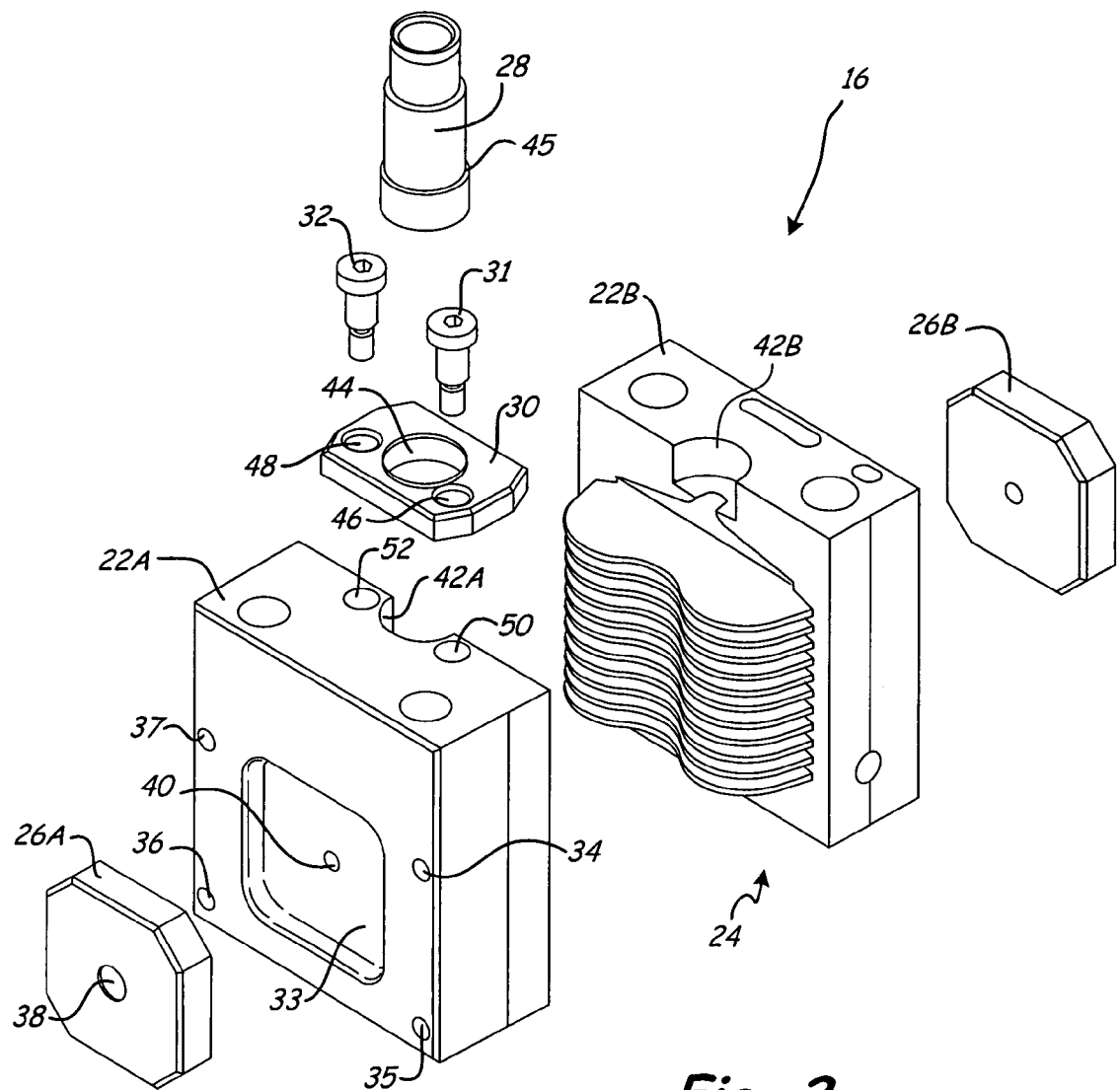
FIG. 2 shows an exploded view of a high volume vacuum/vent block of the present invention.

FIG. 2 shows an exploded view of high volume vacuum/vent block 16 of the present invention. Vacuum/vent block 16 includes stationary-side block 22A, movable-side block 22B and passageway 24. Stationary-side block 22A includes stationary-side key 26A, vacuum line coupling 28, collar 30 and fasteners 31 and 32, while movable-side block 22B includes movable-side key 26B. Stationary-side key 26A and movable-side key 26B are used to secure stationary-side block 22A and movable-side block 22B to stationary die half 12 and movable die half 14, respectively. For example, stationary-side block 22A includes key slot 33 that squarely receives key 26A. Key 26A also fits squarely into a key slot on stationary mold half 12 (shown in FIG. 1) such that stationary-side block 22A mates squarely to mold half 12. A threaded fastener inserted through stationary mold half 12 is inserted through bore 38 of stationary-side key 26A and into bore 40 of stationary-side block 22A. Movable-side key 26B also fits into keys within movable-side block 22B and movable die half 14 such that movable-side block 22B mounts squarely onto movable die half 14. Additionally, vacuum/vent block 16 includes other means for mounting each block half. For example, stationary-side block 22A includes mounting bores 34, 35, 36 and 37 which can be used to mount stationary-side block 22A directly to stationary mold half 12.

Vacuum line coupling 28 is secured to stationary-side block 22A using collar 30 and fasteners 31 and 32. Vacuum line coupling 28 is inserted into a vacuum line coupling seat comprised of seat 42A and 42B located on stationary-side block 22A and movable-side block 22B, respectively. Bore 44 of collar 30 is seated around coupling 28 such that it rests on lip 45 of coupling 28 and the top surfaces of blocks 22A and 22B. Fasteners 31 and 32 are subsequently inserted through bores 46 and 48 of collar 30 and into bores 50 and 52 of stationary-side block 22A to secure coupling 22B to stationary-side block 22A.

Vacuum/vent block 16 includes passageway 24, which provides a channel between cavities 18A and 18B and vacuum line coupling 28. Passageway 24 is formed between mating concave and convex faces of blocks 22A and 22B, respectively. The mating concave and convex faces permit a greater volume of manufacturing material to be withdrawn into vacuum/vent block 16 to purge more air, yet permit easy ejection of solidified manufacturing material from passageway 24.

Figure 3B:
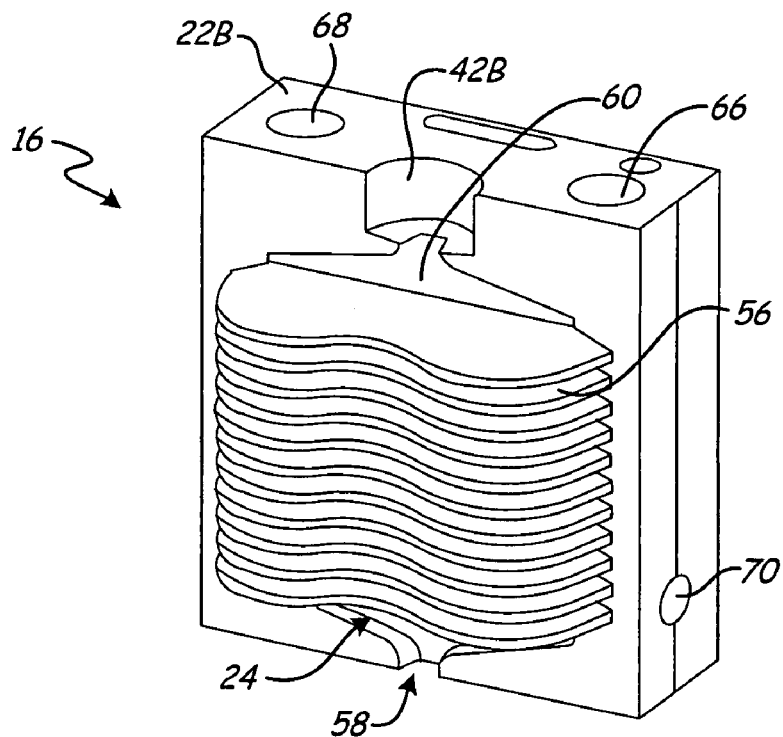
FIG. 3B shows a perspective view of a movable-side high volume vacuum/vent block of FIG. 2.
Figure 3A:
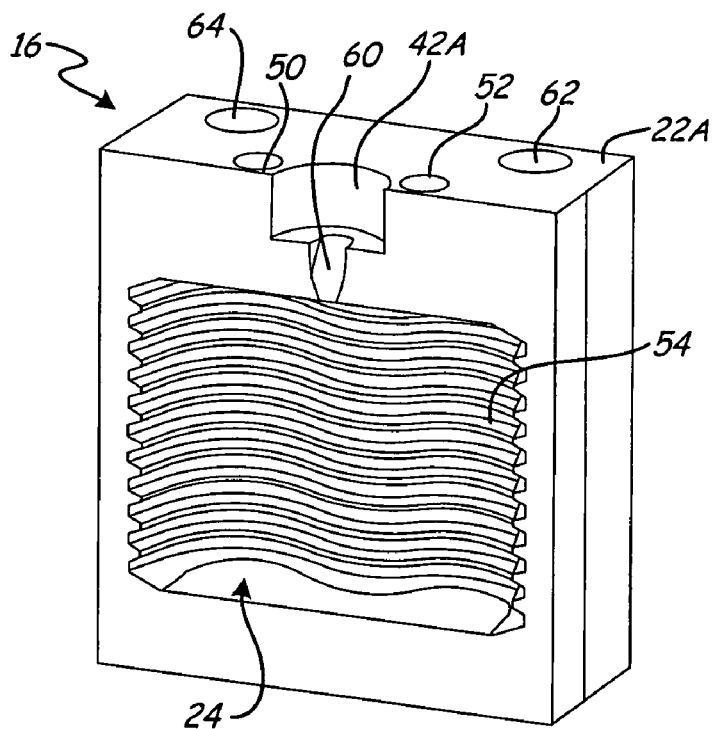
FIG. 3A shows a perspective view of a stationary-side high volume vacuum/vent block of FIG. 2.

FIGS. 3A and 3B show passageway 24 of vacuum/vent block 16. FIG. 3A shows stationary-side block 22A having concave face 54, and FIG. 3B shows movable-side block 22B having convex face 56. Concave face 54 and convex face 56 fit together to form passageway 24. Gas is pushed into passageway 24 at entrance 58 from within cavities 18A and 18B as manufacturing material enters stationary mold 12 and movable mold 14. The manufacturing material continues to enter passageway 24, pushing the gas out exit 60, whereby the manufacturing material solidifies to prevent excess manufacturing material from exiting system 10 through vacuum/vent block 16.

As indicated above, the ability of vacuum/vent block 16 to purge gases without permitting manufacturing material to escape from system 10 depends on its ability to cool manufacturing material running through passageway 24. As molten manufacturing material flows through passageway 24, stationary-side block 22A and movable-side block 22B extract heat from the manufacturing material. Vacuum/vent block 16 accumulates heat from the hot manufacturing material and is thereby limited in its ability to extract additional heat by its ability to dissipate. In order to assist in removing heat from the manufacturing material and passageway 24, and hence vacuum/vent block 16, stationary-side block 22A and movable-side block 22B are provided with cooling fluid channels 62, 64, 66, 68 and 70. A cooling fluid such as water is circulated through cooling channels 62 through 70 to assist in removing heat from vacuum/vent block 16. Cooling channels 62 through 70 are, however, limited in their ability to pull heat away from passageway 24. The cooling fluid can only transfer as much heat as can be imparted into block halves 22A and 22B by the manufacturing material, which is limited by the amount of surface area passageway 24 has to contact the manufacturing material. Therefore, vacuum/vent block 16 is provided with concave face 54 and convex face 56 to increase the surface area of passageway 24.

Concave face 54 and convex face 56 include complimentary ribs and grooves that form a corrugated passageway or channel for drawing gas and manufacturing material from mold cavities 18A and 18B. The corrugation of the passageway increases the surface area and volume of passageway 24 in a first direction across passageway 24. The ribs and grooves of passageway 24 are lineated along mating wave-like, smooth contours to increase the surface area of passageway 24 in a second direction perpendicular to the first direction. A first contour along convex face 56 varies the depth to which concave face 54 extends into stationary-side block 22A. Likewise, the length to which convex face 56 extends out of movable block 22B varies along a second contour matching that of concave face 54. The contouring of concave face 54 and convex face 56 increases the volume of passageway 24 such that more manufacturing material can be drawn from mold cavities 18A and 18B. Thus, more air can also be removed from mold cavities 18A and 18B. Correspondingly, the contouring of concave face 54 and convex face 56 increases the surface area of passageway 24 such that more manufacturing material can be cooled. Additionally, concave face 54 and convex face 56 allow cooled and solidified manufacturing material to be easily removed from passageway 24. Thus, system 10 can be used with a variety of molding and casting systems having varying capacities.

Figure 4A:
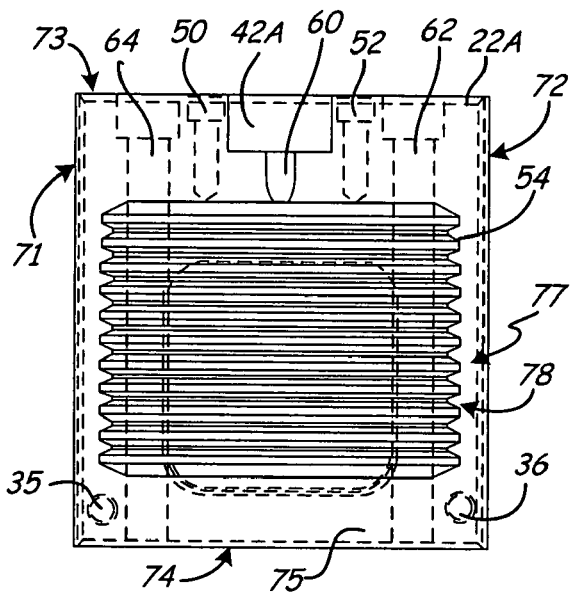
FIG. 4A shows a front view of a stationary-side gas purging block, such as that of FIG. 3A.
Figure 4B:
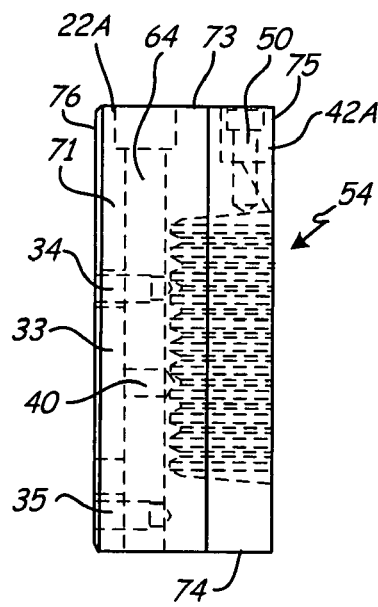
FIG. 4B shows a side view of the stationary-side gas purging block of FIG. 3A.
Figure 4C:
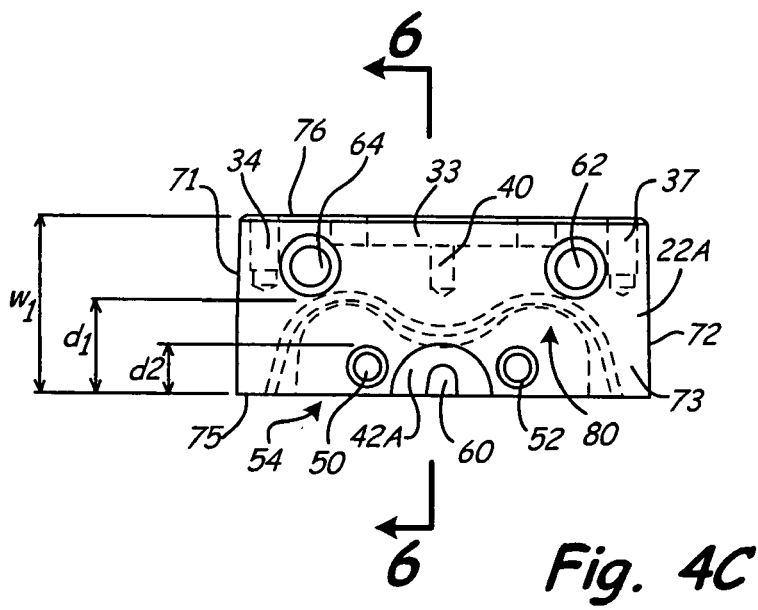
FIG. 4C shows a top view of the stationary-side gas purging block of FIG. 3A.

FIG. 4A shows a front view of stationary-side block 22A of FIG. 3B. FIG. 4B shows a side view of stationary-side block 22A. FIG. 4C shows a top view of stationary-side block 22A. Stationary-side block 22A includes concave face 54 that forms a portion of passageway 24. Stationary-side block 22A also includes key slot 33, fastener bores 34 through 37, bore 40, seat 42A, vacuum line coupling bores 50 and 52, cooling channel bores 62 and 64, first side 71, second side 72, top side 73, bottom side 74, front side 75 and back side 76.

Concave face 54 forms half of passageway 24 through vacuum/vent block 16. Concave face 54 includes a series of ribs 77 and grooves 78 sequenced generally from top 73 to bottom 74, which extend generally across face 54 from first side 71 to second side 72 along contour 80. Gas and manufacturing material enter concave face 54 through entrance 58 of movable-side block 22B (FIG. 3B), flow across ribs 76 and grooves 78, and leave vacuum/vent block 16 at exit 60. Cooling fluid is circulated through cooling channels 62 and 64 to remove heat from concave face 54, while face 54 extracts heat from the manufacturing material flowing through passageway 24. Ribs 77 and grooves 78 increase the longitudinal surface area of passageway 24 and contour 80 increases the transverse surface area of concave face 54 such that the capacity and efficiency of passageway 24 is increased, thus allowing vacuum/vent block 16 to cool more manufacturing material.

Smooth contour 80 increases the transverse surface area of concave face 54 from first side 71 to second side 72 in order to increase its capacity to hold manufacturing material and to increase the amount of heat extractable from the manufacturing material. Concave face 54 extends inward into stationary-side block 22A from front side 75 toward rear side 76 such that contour 80 is fully recessed within the confines of stationary-side block 22A (as defined by sides 71 through 76). Contour 80 is "M" or "W" shaped such that it forms first and second end portions and a middle portion, which are connected by curved segments. The first and second end portions of contour 10 are generally perpendicular to side 75, the middle portion is generally parallel to side 75, and the curved segments are oblique to side 75. However, contour 80 is shaped such that a majority of concave face 54 is generally parallel to the parting line of vacuum/vent block 16, which corresponds to front side 75. Contour 80 is smooth to eliminate points or apexes between straight segments. Thus, none of the surfaces form straight lines or include edges between each portion in order to facilitate ejection of solidified manufacturing material from passageway 24.

Stationary-side block 22A has a width w1, into which the middle portion of face 54 extends from front side 75 less than the first and second end portions of contour 80. For example, with respect to FIG. 4C, the portions of contour 80 closest to first side 71 and second side 72 extend into front side 75 a distance d1 such that they are generally parallel to sides 71 and 72, yet continue to curve inward toward the middle section. The middle portion of contour 80, however, only extends into front side 75 a distance d2, which is somewhat less than distance d1. Thus, material solidified within passageway 24 does not include a deep crevice, which makes it difficult to eject the material from stationary-side block 22A. In one embodiment, distance d1 is approximately greater than half of width w1, while distance d2 is approximately less than half of width w1. The middle portion, which is generally perpendicular to sides 71 and 72, yet is continuously curved, is connected to the end portions by curved segments, which are generally oblique to sides 71 and 72. Thus, concave face 54 does not include sharp edges of flat surfaces that form areas where solidified material can cling to stationary-side block 22A during ejection of the manufactured part. Ribs 77 and grooves 78 further increase the heat extraction from the manufacturing material by increasing the longitudinal surface area of concave face 54 from bottom side 74 to top side 73. Ribs 77, grooves 78 and contour 80 are configured to match with ribs, grooves and a contour on movable-side half 22B.

Figure 5A:
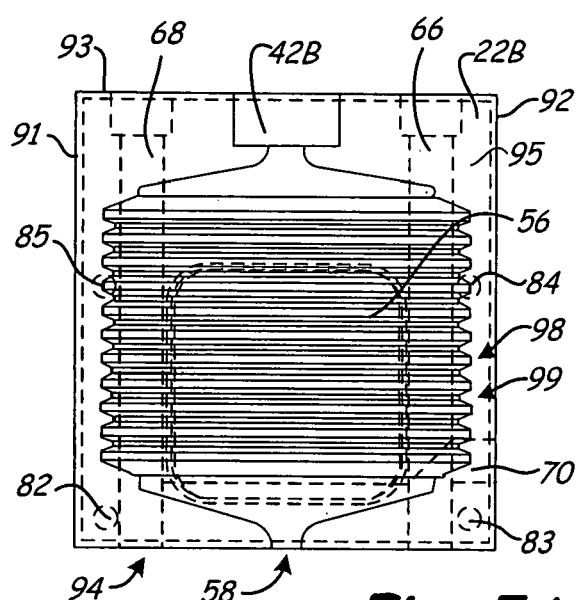
FIG. 5A shows a front view of a movable-side gas purging block, such as that of FIG. 3B.
Figure 5B:
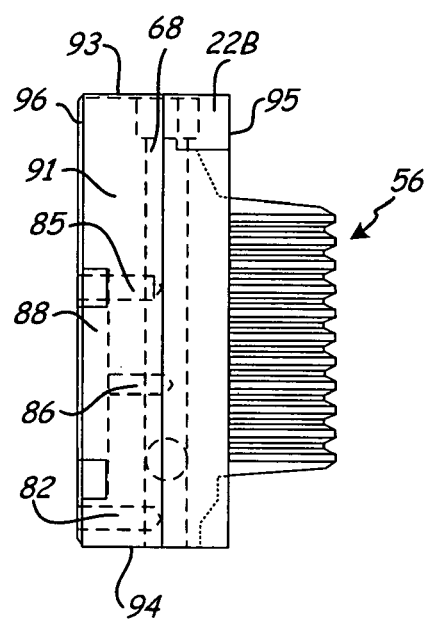
FIG. 5B shows a side view of the movable-side gas purging block of FIG. 3B.
Figure 5C:
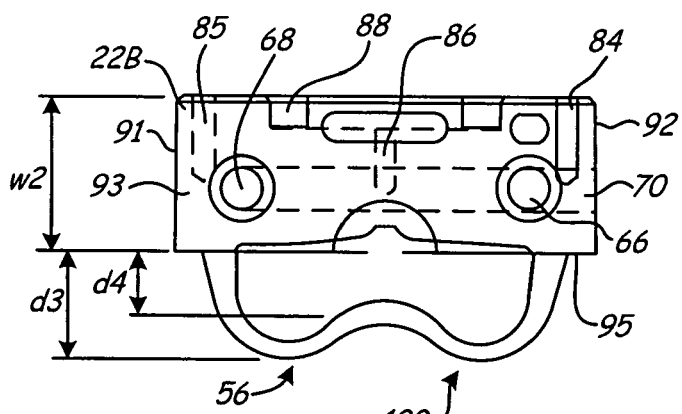
FIG. 5C shows a top view of the movable-side gas purging block of FIG. 3B.

FIG. 5A shows a front view of movable-side block 22B of FIG. 3B. FIG. 5B shows a side view of movable-side block 22B. FIG. 5C shows a top view of movable-side block 22B. Movable-side block 22B includes convex face 56 that forms a portion of passageway 24. Movable-side block 22B also includes key vacuum line seat 42B, cooling channels 66, 68 and 70, fastener bores 82, 83, 84 and 85, bore 86, key slot 88, first side 91, second side 92, top side 93, bottom side 94, front side 95 and back side 96. Fastener bores 82, 83, 84 and 85, bore 86 and key slot 88 serve to secure movable-side block 22B to movable mold half 14 in much the same manner as key slot 33, fastener bores 34 through 37 and bore 40 serve to secure stationary-side block 22A to stationary mold half 12.

Convex face 56 forms half of passageway 24 through vacuum/vent block 16. Convex face 56 includes a series of ribs 98 and grooves 99 sequenced generally from top 93 to bottom 94, which extend generally across face 56 from first side 91 to second side 92 along contour 100. Gas and manufacturing material enter convex face 56 through entrance 58, flow across ribs 98 and grooves 99, and leave vacuum/vent block 16 at exit 60. Cooling fluid is circulated through cooling channels 66 and 68 to remove heat from convex face 56, while face 56 extracts heat from the manufacturing material flowing through passageway 24. Ribs 98 and grooves 99 increase the longitudinal surface area of passageway 24 and contour 100 increases the transverse surface area of convex face 56 such that the capacity and efficiency of passageway 24 is increased, thus allowing vacuum/vent block 16 to cool more manufacturing material.

Smooth contour 100 increases the transverse surface area of convex face 56 from first side 91 to second side 92 in order to increase its capacity to hold manufacturing material and to increase the amount of heat extractable from the manufacturing material. Convex face 56 extends outward from movable-side block 22B from front side 95 toward concave face 54 such that contour 100 is fully extended from the confines of moveable-side block 22B (as defined by sides 91 through 96). Contour 100 is shaped to match that of contour 80 such that passageway 24 has a generally uniform cross section. Contour 100 is "M" or "W" shaped such that it forms first and second end portions and a middle portion, which are connected by curved segments. The first and second end portions are generally perpendicular to side 95, the middle portion is generally parallel to side 95, and the curved segments are oblique to side 95. However, contour 100 is shaped such that a majority of convex face 56 is generally parallel to the parting line of vacuum/vent block 16, which corresponds to front side 95. Contour 100 is smooth to eliminate points or apexes between straight segments. Thus, none of the surfaces form straight lines or include edges between each portion in order to facilitate ejection of solidified manufacturing material from passageway 24.

Movable-side block 22B has a width w2, out of which the middle portion of face 56 extends from face 95 less than the first and second end portions of contour 100. For example, with respect to FIG. 5C, the portions of contour 100 closest to first side 91 and second side 92 extend out of side 95 a distance d3 such that they are generally parallel to sides 91 and 92. The middle portion of contour 100, however, only extends out of front side 95 a distance d4, which is somewhat less than distance d3. Thus, material solidified within passageway 24 does not include a deep crevice, which makes it difficult to eject the material from movable-side block 22B. In one embodiment, distance d3 is approximately greater than half of width w2, while distance d4 is approximately less than half of width w2. The middle portion, which is generally perpendicular to sides 91 and 92, yet is continuously curved, is connected to the end portions by curved segments, which are generally oblique to side 91 and 92. Thus, concave face 54 does not include sharp edges of flat surfaces that form areas where solidified material can cling to stationary-side block 22A during ejection of the manufactured part. Ribs 98 and grooves 99 further increase the heat extraction from the manufacturing material by increasing the longitudinal surface area of convex face 56 from bottom side 94 to top side 93.

Figure 6:
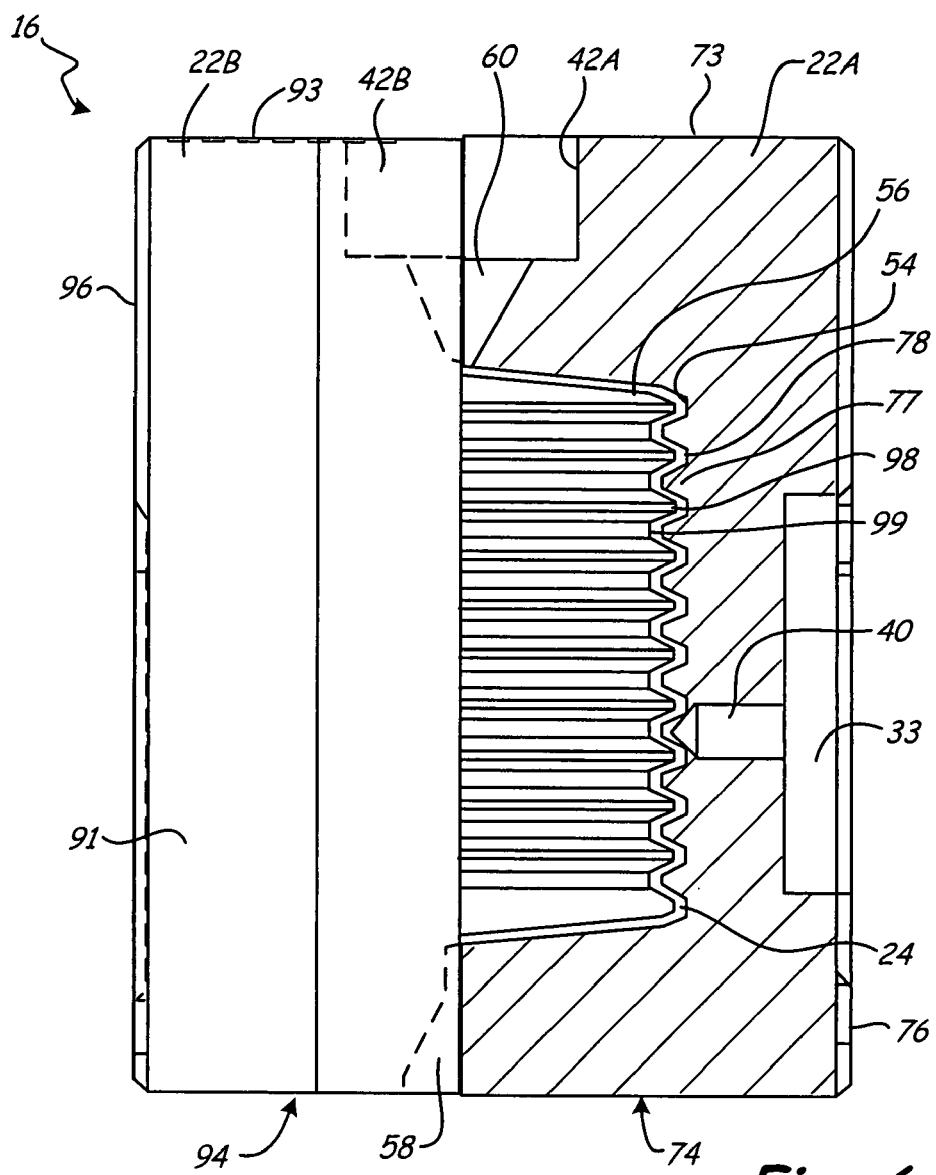
FIG. 6 shows a partial cross section of a stationary-side, high volume, gas purging block assembled with a movable-side, high volume, gas purging block.

FIG. 6 shows a side view of vacuum/vent block 16 including movable-side block 22B as seen from side 71 and cross-section 6-6 from FIG. 4C of stationary-side block 22A. FIG. 6 shows the merging of concave face 54 and convex face 56, with meshing of ribs 77 and grooves 78 with ribs 98 and grooves 99 to form passageway 24, which is exaggerated in FIG. 6 for illustrative purposes. Ribs 77 and 98, grooves 78 and 99, along with contours 80 (FIG. 4C) and 100 (FIG. 5C), increase the volume of passageway 24 to accept increased volumes of manufacturing material and gases purged from cavities 18A and 18B, and increase the distance the manufacturing material must travel before reaching exit 60. Manufacturing material enters entrance 58 pushing gases from within cavities 18A and 18B into passageway 24. Manufacturing material continues to enter passageway 24 pushing the gases out of passageway 24 through exit 60. However, concave face 54 and convex face 56 are configured such that they draw heat away from the manufacturing material such that it will solidify before leaving vacuum/vent block 16 through exit 60, but after a large volume of gas is purged from cavities 18A and 18B via a large volume of manufacturing material being passed into passageway 24.

Ribs 77 mesh with grooves 98 and ribs 98 mesh with grooves 78 to maintain an approximately uniform cross sectional flow area for the manufacturing material. This disperses the manufacturing material into a thin sheet as it flows through passageway 24 such that concave face 54 and convex face 56 readily absorb heat present in the manufacturing material. The transverse surface areas of concave face 54 and convex face 56, from sides 71 and 91 to sides 72 and 92, respectively, are increased through the use of contours 80 (FIG. 4C) and 100 (FIG. 5C), respectively. Ribs 77 and 98, and grooves 78 and 99 increase the longitudinal surface areas of concave face 54 and convex face 56 from bottom surfaces 74 and 94 to top surfaces 73 and 93, respectively. Correspondingly, the volume of passageway 24 is increased such that increased volumes of manufacturing material and gases can be removed from the mold cavities.

The manufacturing material must flow down into each groove 78 and back up each rib 77 as it traverses face 54 toward exit 60 at sides 73 and 93, thus increasing the residence time of the manufacturing material in passageway 24. Simultaneously, the manufacturing material is flowing up ribs 98 and then down grooves 99 as it traverses face 56. As the manufacturing material is traversing up and down through ribs 77 and 98, and grooves 78 and 99, the manufacturing material is also traversing the shape of the contours. In the embodiment shown, the manufacturing material enters passageway 24 at a mid-point along contours 80 and 100 (See FIG. 3B). From there the manufacturing material flows along contours 80 and 100 traveling out along convex face 56 and in along concave face 54 towards sides 71 and 91, and 72 and 92. Thus, the manufacturing material not only climbs and descends the ribs and grooves, but flows between them as well. Ribs 77 and 78, grooves 78 and 99 are shaped to facilitate heat transfer from the manufacturing material and to facilitate meshing and un-meshing of concave face 54 and convex face 56.

Figure 7:
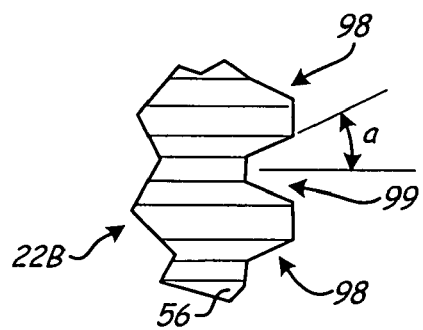
FIG. 7 shows a close-up view of trapezoidal ribs and channels used with the stationary-side and movable-side gas purging blocks of the present invention.

FIG. 7 shows a close-up view of ribs 98 and groove 99 used on movable-side block 22B of the present invention. Ribs 98 and groove 99 are representative of the ribs and grooves used on both concave face 54 and convex face 56. Ribs 98 extend outward from face 56 in a trapezoidal profile. Likewise, groove 99 has a trapezoidal profile that is the inverse of the trapezoidal profile of ribs 98, as groove 99 represents the area between ribs 98. The bases and tips of ribs 98 are approximately parallel to the general orientation of passageway 24. The sidewalls of ribs 98 are generally oblique to the general orientation of passageway 24. The sidewalls of ribs 98 extend from face 56 outward and slope toward each other to form a trapezoidal profile. For example, ribs 98 extend outward from face 56 at angle a. In one embodiment angle α is approximately thirty degrees from a line perpendicular to face 56 (or about one hundred twenty degrees from face 56). In other embodiments, angle a ranges from about fifteen to about forty five degrees. However, angle a can be any angle that permits face 56 and face 54 to engage and disengage without binding.

Due to the shape of passageway 24, ribs 98 and grooves 99, vacuum/vent block 16 is easily manufactured and easily operated. Previous designs for ribbed vacuum/vent blocks included square cut or square-wave type contours having square or triangular shaped ribs and grooves. Square-wave type contours and square shaped ribs and grooves have disadvantages, especially when used in conjunction with each other along generally vertically oriented cooling surfaces. Square cut ribs must be precisely aligned to prevent binding of the movable and stationary side gas purging blocks during opening and closing of the die/mold. The binding is compounded when square ribs are disposed along a square-wave contoured cooling faces. The cooling faces and square ribs must be also be accurately machined, which increases production costs. Thus, the trapezoidal ribs 98 and grooves 99 of the present invention are used, as they permit some misalignment in the meshing of face 54 with face 56. For example, the narrow tips of ribs 98 on face 56 need only align with the much wider groove 78 on face 54. This facilitates non-binding meshing and uncoupling of stationary-side block 22A and movable-side block 22B.

Likewise, square-wave type contouring also requires a high level of alignment between the movable and stationary side blocks and requires more intricate machining. The shape of concave face 54 and convex face 56 facilitates smooth meshing and uncoupling of vacuum/vent block 16. Concave face 54 and convex face 56 are also more readily manufactured than other shaped cooling faces due to their elimination of sharp edges and sharp angles, such as with square-wave type contouring. Concave face 54 and convex face 56 include contours 80 and 110, respectively, which have smooth, gently sloping surfaces. The shape of these surfaces permits moveable side block 22B to be easily pulled away from stationary-side block 22A, and also permits each block half to be made in fewer machining steps as compared to, for example, vacuum/vent blocks having multiple, flat faces with multiple, steep angles. Each flat surface along the cooling surface typically requires reorienting the block half within the machining equipment. The smooth contour of the present invention facilitates easier and faster manufacturing, which results in less expensive vacuum/vent blocks.

Vacuum/vent block 16, including ribs 77 and 98, and grooves 78 and 99, can be made of any material suitable for either injection molding or die casting. Any high-wear material with good heat transfer characteristics (e.g. high thermal conductivity), such as copper, steel, premium AISI H-13 or S-7 heat-treated steel or equivalents, tool steels, beryllium or beryllium-free material may be used.

The relative sizes of stationary-size block 22A and movable-side block 22B shown in FIGS. 1-7 are exemplary only. Stationary-size block 22A and movable-side block 22B, can be made having various dimensions for use in smaller or larger die casting or injection molding operations. However, for each particular size of stationary-size block 22A and movable-side block 22B, contours 80 and 100 increase the volume and surface area of passageway 24 such that additional manufacturing material can be held and cooled within passageway 24 as compared to a same-sized block without contours 80 and 100. Casting and molding systems having large capacities require large amounts of gases to be purged from their respective systems and large amounts of manufacturing material to be pushed into the gas purging block for cooling. The present invention achieves a high-volume vacuum/vent block without increasing the overall dimensions of the block. Thus, the vacuum/vent block of the present invention is readily integrated into existing casting and molding systems having standard vacuum/vent block pockets. The increased volume of the present invention also permits the vacuum/vent block to be used with casting and molding systems having a large molding and casting shot sizes.

Although the present invention has been described with reference to preferred embodiments, workers skilled in the art will recognize that changes may be made in form and detail without departing from the spirit and scope of the invention.

The invention claimed is:

1. A gas purging block for use with injection molding and die casting systems, the gas purging block comprising:
a stationary-side block for connecting to a stationary mold or die half, the stationary side block comprising a recessed cooling face having a first smooth contour extending between a first side and a second side of the stationary-side block to increase the surface area of the recessed cooling face; and
a movable-side block for connecting to a movable mold or die half, the movable side block comprising a protruding cooling face having a second smooth contour extending between a first side and a second side of the movable-side block to increase the surface area of the protruding cooling face;
wherein the first smooth contour and the second smooth contour do not include flat portions along the contours such that edges along the contour are eliminated.

2. The gas purging block of claim 1 wherein the first contour and the second contour have an M-shaped or W-shaped lineation in a direction extending between the first sides and second sides.

3. The gas purging block of claim 1 wherein the second contour mates with the first contour such that the recessed cooling face receives the protruding cooling face to form a gas purging and material cooling passageway of nearly uniform cross sectional area.

4. The gas purging block of claim 3 wherein the first side and second side of the stationary side block have a width and the first contour extends into the stationary side block to a depth over half the width.

5. The gas purging block of claim 3 wherein the first side and second side of the stationary side block extend approximately perpendicular between a front side and a back side, and wherein the first contour extends partially approximately parallel to the first side and second side, partially approximately perpendicular to the first side and the second side and partially obliquely to the first side and the second side.

6. The gas purging block of claim 3 wherein the recessed cooling face has a center portion that extends into the stationary side block to a depth less than that of a first edge portion and a second edge portion.

7. The gas purging block of claim 3 wherein the first contour and the second contour increase the volume of the gas purging and material cooling passageway.

8. The gas purging block of claim 1 wherein the recessed cooling face comprises a first plurality of ribs and grooves, and the protruding cooling face comprises a second plurality of ribs and grooves, wherein the first plurality of ribs and grooves mesh with the second plurality of ribs and grooves to provide a narrow passageway between the recessed cooling face and the protruding cooling face.

9. The gas purging block of claim 8 wherein the first plurality of ribs and grooves have a first trapezoidal profile matching that of a second trapezoidal profile of the second plurality of ribs and grooves, wherein the sides of the trapezoidal profiles are sloped approximately one hundred thirty-five to approximately one hundred and five degrees from the recessed cooling face.

10. The gas purging block of claim 1 wherein the stationary-side block and movable-side block are comprised of a material selected from the group consisting of copper and steel.

11. A gas purging block for use with injection molding and die casting systems, the gas purging block comprising:
a stationary-side block comprising:
a first stationary side;
a second stationary side;
a concave heat exchanging surface extending between the first and second stationary sides and adapted to cool manufacturing material, the concave heat exchanging surface having a first lineation to increase transverse surface area of the concave heat exchanging surface between the first and second stationary sides; and
a plurality of trapezoidal ribs extending from the concave heat exchanging surface for increasing longitudinal surface area of the concave heat exchanging surface between the first and second stationary sides; and
an ejector-side block adapted to engage with the stationary-side block, comprising:
a first ejector side;
a second ejector side;
a convex heat exchanging surface extending between the first and second ejector sides and adapted to cool manufacturing material, the convex heat exchanging surface having a second lineation to increase transverse surface area of the concave heat exchanging surface between the first and second ejector sides; and
a plurality of trapezoidal channels extending into the convex heat exchanging surface for increasing the longitudinal surface area of the convex heat exchanging surface between the first and second ejector sides.

12. The gas purging block of claim 11 wherein the plurality of trapezoidal ribs and the plurality of trapezoidal channels are sloped approximately one hundred five to about one hundred thirty five degrees from the convex or concave cooling faces, respectively.

13. The gas purging block of claim 11 wherein the second contour matches the first contour.

14. The gas purging block of claim 11 wherein the first contour and the second contour have an M-shaped or W-shaped profile.

15. The gas purging block of claim 11 wherein:
the first stationary side and second stationary side of the stationary side block have a first width and the first contour extends into the stationary side block to a depth over half the first width; and
the first ejector side and second ejector side of the ejector side block have a second width and the second contour protrudes from the ejector side block to a distance over half the second width.

16. The gas purging block of claim 11 wherein:
the first stationary side and second stationary side of the stationary side block have a first width and the first contour extends partially approximately parallel to the first and second stationary sides, partially approximately perpendicular to the first and second stationary sides and partially obliquely to the first and second stationary sides; and
the first ejector side and second ejector side of the ejector side block have a second width and the second contour extends partially approximately parallel to the first and second ejector sides, partially approximately perpendicular to the first and second ejector sides and partially obliquely to the first and second ejector sides.

17. The gas purging block of claim 11 wherein:
the concave cooling face has a center portion that extends into the stationary side block to a depth less than that of a first edge portion and a second edge portion of the first contour; and
the convex cooling face has a center portion that extends out of the ejector side block to a length less than that of a first edge portion and a second edge portion of the second contour.

18. The gas purging block of claim 11 wherein the concave heat exchanging surface mates with the convex heat exchanging surface to form a gas purging and material cooling passageway having an increased volume as compared to heat exchange surfaces without the first and second lineations.

19. The gas purging block of claim 11 wherein the concave heat exchange surface is recessed fully within the confines of the stationary-side block, and the convex heat exchange surface protrudes fully from the confines of the moveable-side block.

20. A block-half for use with a vacuum/vent block in injection molding and die casting systems, the block-half comprising:
a first side surface;
a second side surface approximately parallel to the first side surface;
a top surface disposed between the first side surface and the second side surface;
a bottom surface approximately parallel to the top surface;
an exterior surface disposed between the first side surface and the second side surface;
an interior cooling surface disposed perpendicularly between the first side surface and the second side surface;
a cooling passageway disposed along the interior cooling surface from the top surface to the bottom surface, the cooling passageway comprising:
a longitudinal series of trapezoidal ribs running transversely across the cooling passageway between the first side and the second side; and
a transverse smooth contour for varying a depth of the trapezoidal ribs into the interior cooling surface; and
a pair of coolant fluid channels extending through the block-half between the top surface and bottom surface.

21. The block-half of claim 20 wherein:
the cooling passageway is recessed into the interior cooling surface; and
the contour varies a depth of the cooling passageway between the exterior surface and the interior surface.

22. The block-half of claim 20 wherein:
the cooling passageway protrudes from the interior cooling surface; and
the contour varies an extent of the protrusion of the cooling passageway from the interior surface.

23. The block-half of claim 20 wherein the transverse contour comprises a wave-like shape.

24. The block-half of claim 20 wherein the smooth contour does not include apexes along the contour.

25. The block-half of claim 20 wherein a majority of the cooling passageway is disposed generally parallel to a parting line of the injection molding or die casting system.

26. A gas purging block for use with injection molding and die casting systems, the gas purging block comprising:
   a first-side block for connecting to a mold or die half, the first-side block comprising a recessed cooling face having a first smooth contour extending between a first side and a second side of the first-side block to increase a surface area of the recessed cooling face, the recessed cooling face comprising:
      a first edge portion and a second edge portion extending into the first-side block to a depth; and
      a center portion that extends into the first-side block to a depth less than that of the first edge portion and the second edge portion; and
   a second-side block for connecting to a mold or die half, the second-side block comprising a protruding cooling face having a second smooth contour extending between a first side and a second side of the second-side block to increase a surface area of the protruding cooling face;
   wherein the second contour mates with the first contour such that the recessed cooling face receives the protruding cooling face to form a gas purging and material cooling passageway of nearly uniform cross sectional area.

* * * * *